United States Patent [19]
Bergmann et al.

[11] 4,043,603
[45] Aug. 23, 1977

[54] VEHICLE WHEEL ASSEMBLY FOR A TOY VEHICLE

[75] Inventors: Henry F. Bergmann, Sterling Heights; Bernard J. Oswald, Fraser, both of Mich.

[73] Assignee: AMT Corporation, Troy, Mich.

[21] Appl. No.: 691,563

[22] Filed: June 1, 1976

Related U.S. Application Data

[62] Division of Ser. No. 587,423, June 16, 1975, Pat. No. 3,985,392.

[51] Int. Cl.² .................... B60B 5/02; B60C 7/24
[52] U.S. Cl. ...................... 301/63 PW; 46/221; 152/301; 152/309
[58] Field of Search ............ 301/63 PW, 5.3, 5.7, 301/63 R; 152/301, 306–309, 378; 46/221; D12/134–135, 204; D34/15 AJ

[56] References Cited

U.S. PATENT DOCUMENTS

| 2,978,277 | 4/1961 | Gaudry | 301/63 PW |
| 3,695,728 | 10/1972 | Haussels | 301/63 PW X |
| 3,733,744 | 5/1973 | Hiltpold et al. | 46/221 X |
| 3,807,474 | 4/1974 | Wendt et al. | 301/63 PW X |

FOREIGN PATENT DOCUMENTS

| 628,786 | 10/1961 | Canada | 301/63 PW |

*Primary Examiner*—Robert B. Reeves
*Assistant Examiner*—Charles A. Marmor
*Attorney, Agent, or Firm*—McGlynn and Milton

[57] ABSTRACT

A vehicle wheel assembly for a toy vehicle including a substantially hollow tire portion including two structurally identical mating shells made of a relatively rigid plastic material, such as, polypropylene, polyethylene, or polystyrene, wherein the shells are mated along the centerline of the tire portion, a wheel portion for receiving the tire portion, and a retainer lip extending radially inwardly from each of the mating shells to frictionally engage the wheel portion and retain the shells in mating engagement on the wheel portion.

6 Claims, 6 Drawing Figures

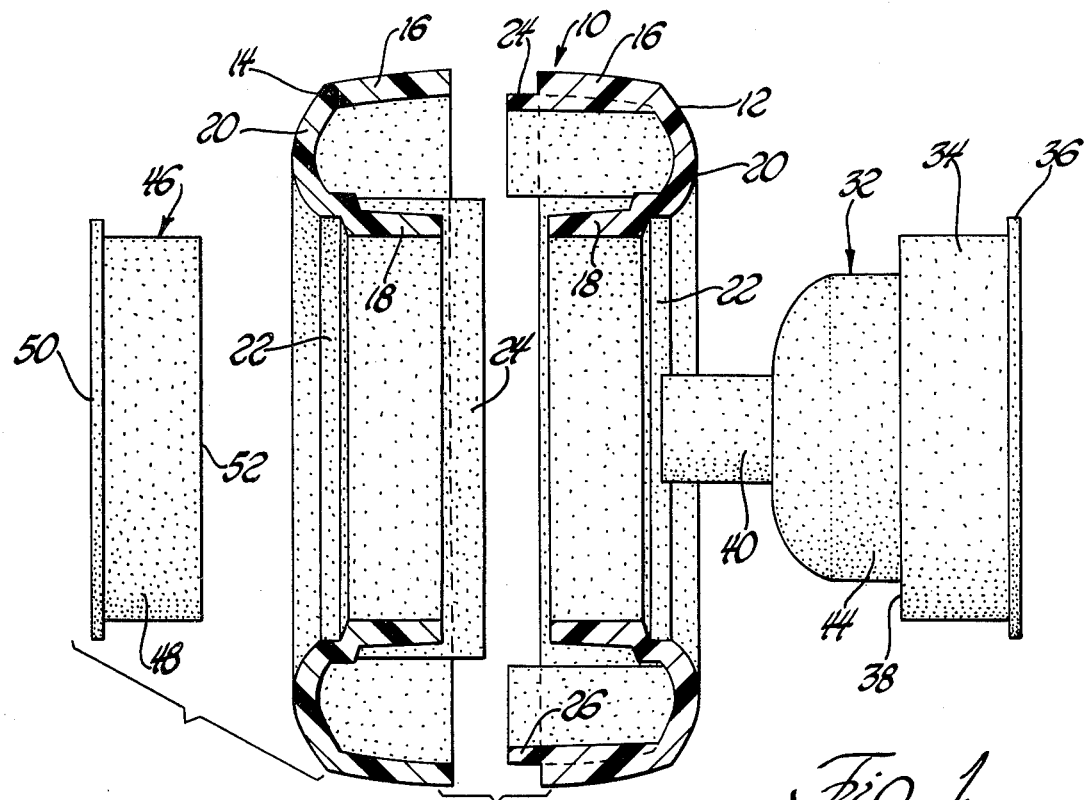
Fig. 1
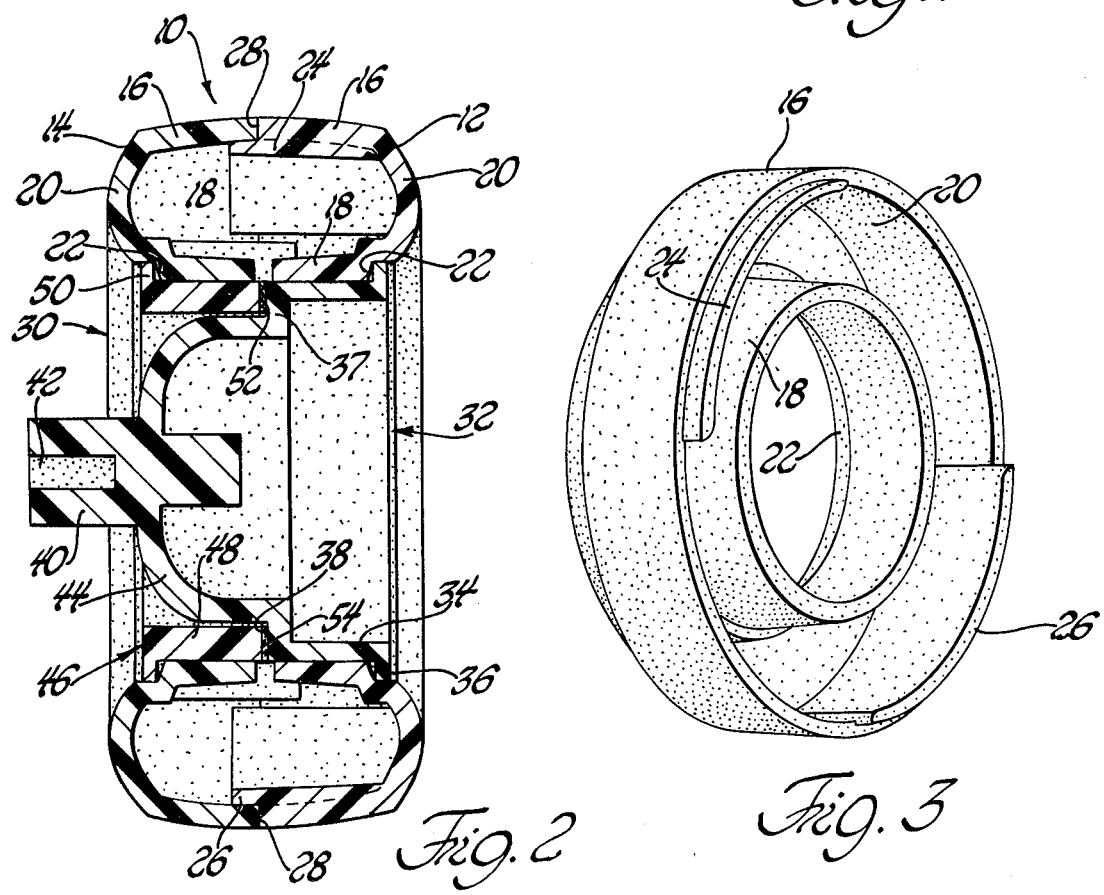
Fig. 2
Fig. 3

VEHICLE WHEEL ASSEMBLY FOR A TOY VEHICLE

This is a divisional of patent application Ser. No. 587,423, filed June 16, 1975, now U.S. Pat. No. 3,985,392, issued Oct. 12, 1976.

This invention relates to a vehicle wheel assembly which is particularly suited for use in toy vehicles, such as, scale model vehicles which are assembled from a kit.

DESCRIPTION OF PRIOR ART

Vehicle wheel assemblies for toy vehicles which are assembled from a kit generally include two basic portions; a tire portion and a wheel portion on which the tire portion is mounted. It will be recognized that this wheel assembly is similar to that of standard size vehicles since, of course, it is desirable that the scale model be as authentic looking as possible with respect to the actual full-size vehicle. Heretofore, the tire portion of most scale model vehicle wheel assemblies has been of a one-piece construction. In other words, the tread and sidewalls of the tire are formed integrally. Specifically, the tire portion has been made by an injection-molding process using polyvinyl chloride. Since polyvinyl chloride is quite flexible, a complete tire portion can be molded about a core and subsequently removed from the core by deforming the tire and slipping it off. This is normally accomplished by reducing the thickness of one of the sidewalls so that the tire portion can be easily removed from the core. If the tire portion is made of a less flexible material, such deformation would crack and thus destory the tire portion. In short, due to the flexibility of polyvinyl chloride, the presence of undercuts does not pose a major problem. As will be seen, this is not always the case with other kinds of plastics.

In order to mount the tire portion, a wheel portion, preferably molded from polystyrene, is provided and is adapted to receive the polyvinyl chloride tire portion. In most cases, the wheel portion is of a one-piece construction. To provide a firm mounting on the wheel portion, the internal diameter of the sidewalls are made somewhat smaller than the outer diameter of the wheel portion. The use of an "undersize" inner diameter is possible when polyvinyl chloride is employed since this material is capable of stretching. The tire can therefore be forced onto the wheel since the internal diameter of the tire portion can expand slightly. Furthermore, due to the resilience of the tire portion, it firmly grips the outer diameter of the wheel portion to keep the tire in place.

In some tire designs the tread portion of the tire is relatively wide and a one-piece wheel is not adequate to mount the tire. In this case, a two-piece wheel is employed. The two-piece wheel is also made of polystyrene. Since polystyrene is soluble in organic solvents, such as, those containing aromatic hydrocarbons and esters, it can be glued to itself by using commercially available plastic cement. Each of the two pieces of the wheel includes a radially-outwardly extending flange for retaining the tire portion on the wheel. First, one piece of the wheel is inserted into the inner diameter of the tire portion. The second piece of the wheel is then inserted from the opposite side of the tire and is glued to the first piece. When the two pieces are glued together, a complete wheel portion is produced and the tire portion is maintained in position on the wheel by the radially-extending flanges on each of the two pieces.

Although most polyvinyl chloride tires are of a one-piece construction, some tires, also due to a relatively wide tread portion, are more conveniently made in two pieces. The two-piece construction consists of a first piece comprising one sidewall and the entire tread portion and a second piece comprising the other sidewall. Since polyvinyl chloride is insoluble in most organic solvents, it cannot easily be glued to itself or other plastics using economically reasonable and commercially available plastic cements. Therefore it is necessary to use a two-piece polystyrene wheel of the type described above to hold the two pieces of the tire together.

The major drawback associated with the two-piece tire portion is that two molds must be provided - one for each of the two different pieces. The requirement of two molds means that two different operations are necessary for producing a single tire portion. This, of course, adds to the cost of the assembly.

Although, from a manufacturing standpoint, the physical properties of polyvinyl chloride have been more than adequate for injection molding tires for toy vehicles, the steadily increasing cost and reduced availability of polyvinyl chloride has encouraged manufacturers to seek other less expensive plastic materials. Moreover, it has been rumored that polyvinyl chloride is a carcinogenic material. Even though, at the present time this has not been absolutely verified, reasonable prudence suggests that a substitute material should be employed, particularly in view of the fact that the wheel assembly is used in toy vehicles frequently handled by children. The foregoing circumstances, therefore militate against continued use of polyvinyl chloride for such wheel assemblies. The problem, however, is that, due to the physical characteristics of reasonable substitutes for polyvinyl chloride, a one-piece tire construction can no longer be employed. Specifically, plastics, such as, polypropylene, polyethylene and polystyrene, which may be used in place of polyvinyl chloride are not very flexible and, therefore, it is impossible to strip a one-piece tire made from such plastics from a core. This, of course, is due to the undercut in the mold which is needed to form the sidewalls of the tire. When the undercut is substantial, it is impossible to remove the molded piece from the mold without destorying it. Consequently, it is necessary to employ a two-piece tire construction. In order to make the use of such substitutes economically feasible, steps must be taken to reduce the increased manufacturing costs which naturally proceed from a change to a two-piece tire construction.

SUMMARY OF THE INVENTION

By way of summary, the instant invention provides a vehicle wheel assembly for a toy vehicle in which the tire portion comprises an assembly of two structurally identical shells made of a relatively rigid material. Since the two shells are structurally identical, both pieces of the assembly can be made with the same mold. Consequently, substitutes for polyvinyl chloride such as polypropylene, polyethylene and polystyrene become economically attractive. In short, the instant invention facilitates the use of these materials in a two-piece tire construction and, therefore, permit a substitution for polyvinyl chloride, by reducing the manufacturing cost involved.

Other advantages of the present invention will be readily appreciated as the same becomes better understood by reference to the following detailed description when considered in connection with the accompanying drawings wherein:

FIG. 1 is an elevational exploded view, partially in cross section, of one embodiment of a vehicle wheel assembly for a toy vehicle constructed in accordance with the instant invention;

FIG. 2 is a cross-sectional assembled view of the wheel assembly shown in FIG. 1;

FIG. 3 is a perspective view of one piece of the two-piece tire portion;

Figure 4:
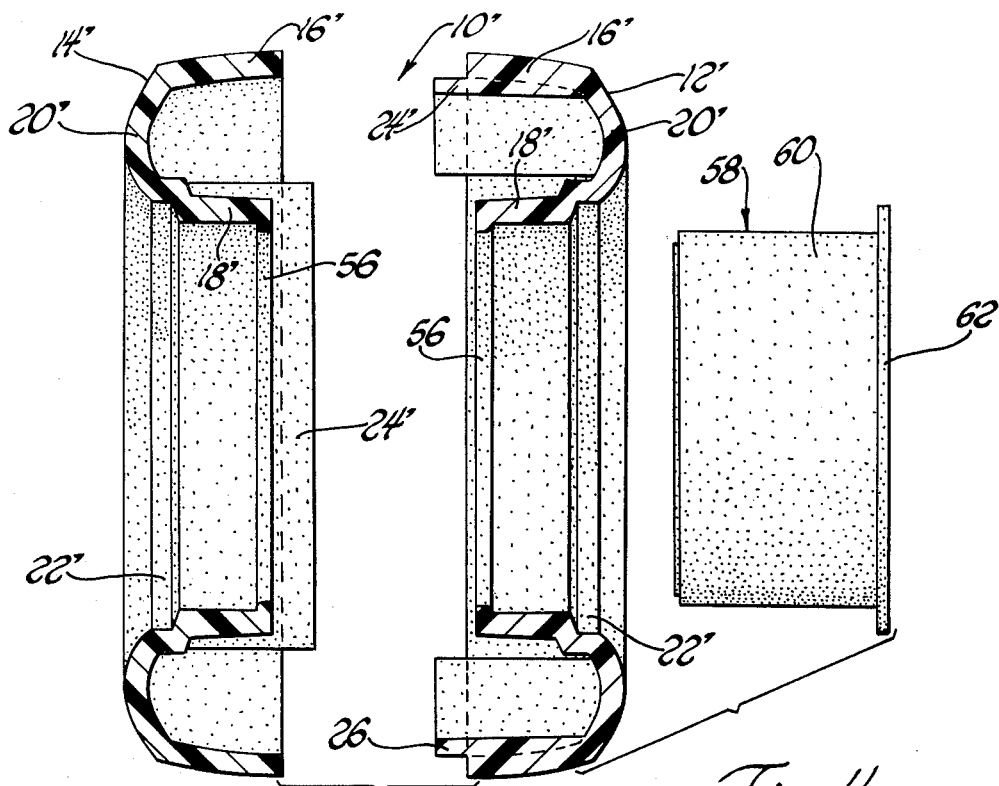
FIG. 4 is an elevational, exploded view, partially in cross section, of a second embodiment of a vehicle wheel assembly for a toy vehicle constructed in accordance with the instant invention.

Referring more particularly to the drawings, one embodiment of a vehicle wheel assembly for a toy vehicle is shown in FIGS. 1 through 3. The vehicle wheel assembly, generally shown at 10, includes a substantially hollow tire portion including two structurally identical shells 12 and 14. The shells 12 and 14 are made by an injection-molding process from a relatively rigid plastic material. The term "relatively rigid", as used herein, means that the plastic material does not have the flexible physical characteristics of polyvinyl chloride. Examples of such materials are polypropylene, polyethylene and polystyrene. Since these materials are stiff and inflexible, substantial undercuts which would frustrate removal of the tire from the core must be avoided. Consequently, a complete, one-piece tire portion cannot be molded from any of these materials since the molded part could not be removed from the core. A two-piece design comprising the two shells 12 and 14 must be employed. As will be more particularly described below, each of the two shells 12 and 14 are structurally identical. Therefore, a single mold may be employed to make both pieces of the two-piece tire portion. The tire portion is designed so that any two pieces produced by the mold may be fitted together to form a complete tire portion. In this manner, the need for multiple molds, as well as multiple forming steps, is eliminated. Consequently, the manufacturing costs of producing a two-piece tire portion is only slightly greater than the manufacturing costs of a one-piece tire portion of polyvinyl chloride. The use of substitutes for polyvinyl chloride, therefore, becomes more economically feasible.

Both of the shells 12 and 14 are identical to the shell shown in FIG. 3. More specifically, each of the shells 12 and 14 includes an outer annular wall 16, an inner annular wall 18 which is generally concentric with the outer wall 16, and a sidewall 20 joinging the inner and outer walls 16 and 18 along their exterior edges. The exterior surface of the outer wall 16 of each shell forms one-half of the tread of the tire portion. The inner wall 18 of each shell forms one-half of a cylindrical passageway through the tire portion for receiving a wheel portion. The sidewalls 20 join the outer and inner walls 16 and 18 together to complete the shell construction.

Each of the shells 12 and 14 also include an annular recess 22 located at the juncture between the inner annular wall 18 and the sidewall 20. As will be hereinafter described, the annular recess 22 is adapted to receive a flange on the wheel portion. Each of the shells 12 and 14 also includes a pair of flanges 24 and 26 which are offset radially inwardly from the outer annular wall 16 and extend beyond the edges of the outer wall 16 for underlying the outer annular wall 16 of the mating shell. Since two flanges 24 and 26 are employed on each of the shells 12 and 14, the arcuate length of each of the flanges 24 and 26 is not more than one-quarter of the circumference of the outer annular wall 16. Additionally, the flanges 24 and 26 are located symmetrically and diametrically opposite each other. When two shells 12 and 14 are brought together, the flanges 24 and 26 on one of the shells are rotated 90° with respect to the flanges on the other of the shells. As a result, the flanges on the shells form an almost continuous flange which underlies the parting line 28 between the two shells 12 and 14. In order to make the shells 12 and 14 structurally identical, the tire portion is separated along its centerline into the two shells 12 and 14. The two flanges 24 and 26 on the shells are provided to facilitate alignment of the shells and mutual support. It is noted that more or fewer flanges may be employed so long as the shells 12 and 14 are structurally identical and the flanges on each shell are arranged symmetrically and cover no more than one-half the diameter of the outer wall 16 to insure interfitting.

The shells 12 and 14 are preferably made of polypropylene or polyethylene. Although, from a technical standpoint, polystyrene may be employed, the tone, feel, and appearance of polypropylene and polyethylene shells are much more like that of real rubber tires. Therefore, from an aesthetic standpoint, polypropylene and polyethylene are more desirable materials for the shells.

Since polypropylene and polyethylene are not soluble in most organic solvents, tire shells made of these materials cannot be glued together as are other components of scale model vehicles. Therefore, some other means for retaining the shell members 12 and 14 in mating engagement must be provided. In the embodiment shown in FIGS. 1 through 3, a two-piece wheel portion, generally indicated at 30, is provided for the purpose. The wheel portion includes a first member generally indicated at 32 which includes a substantially cylindrical portion 34 for receiving the inner wall 18 of one of the shells. In other words, as shown in FIG. 2, in the assembled position, the inner wall 18 of the shell 12 snugly encircles the cylindrical portion 34 of member 32. A flange 36 extends radially from the exterior end of the cylindrical portion 34 for engaging the shell. In the assembled condition, the flange 36 seats in the recess 22 formed at the juncture between the inner wall 18 and sidewall 20. The flange 36 prevents the shell 12 from sliding off of the cylindrical portion 34 toward the right as viewed in FIG. 2. The member 32 also includes a wall 37 which defines an inwardly-facing bonding surface 38 at the interior end of the cylindrical portion 34. As will be hereinafter described, the bonding surface 38 on the first member 32 is adapted to abut a similar bonding surface on the second member of the wheel portion for bonding thereto.

In the embodiment shown in FIGS. 1 and 2, the first member 32 of the wheel portion 30 also includes an axle sleeve 40 having a cylindrical blind bore 42 therein for receiving the end of an axle (not shown). The axle sleeve 40 is supported by means of a domed portion 44 which extends from the inwardly extending wall 37 which forms the bonding surface 38.

The second member of the wheel portion 30, which is generally indicated at 46, acts in conjunction with the first member 34 to mount the tire portion. The second member 46 includes a substantially cylindrical portion 48 for receiving the inner annular wall 18 of the other shell 14. In other words, as shown in FIG. 2, in the assembled condition, the two cylindrical portions 34 and 48 of the first and second members 34 and 46 of the wheel portion 30 form a continuous cylindrical surface which is surrounded by the inner annular walls 18 of the shells 12 and 14. The retaining ring 48 also includes a flange 50 extending radially from the exterior end of the cylindrical portion 48 for engaging the shell 14. The flange 50 seats in the recess 22 formed at the juncture between the inner wall 18 and sidewall 20 of the shell 14. The flange 50 prevents the shell 14 from sliding off of the cylindrical portion 48 toward the left as viewed in FIG. 2. The interior end of the cylindrical portion 48 terminates in an inwardly facing bonding surface 52. The bonding surface 52 of the second member 46 is adapted to abut the bonding surface 38 of the first member 32.

Both members 32 and 46 of the wheel portion 30 are made of a gluable plastic material. In the sense used herein, "gluable" means that the plastic material is soluble in most organic solvents. Preferably, the members are made of polystyrene which is soluble in aromatic hydrocarbons and esters. Accordingly, the two members 32 and 46 of the wheel portion 30 may be bonded together by means of commercially available plastic cement. Accordingly, a layer of plastic cement is applied to one or both of the bonding surfaces 38 and 52 to form a bonding layer 54 between the two members 32 and 46 of the wheel portion 30. When bonded together in this fashion, the wheel portion 30 permanently maintains the tire portion in the assembled condition. In other words, the shell members 12 and 14 are held in mating engagement and remain mounted on the wheel portion 30.

Figure 5:
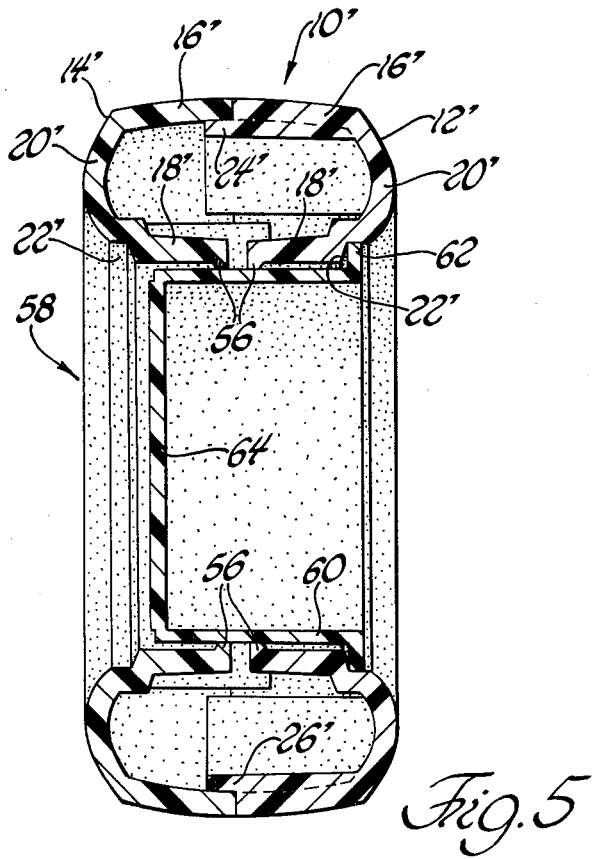
FIG. 5 is a cross-sectional assembled view of the vehicle wheel assembly shown in FIG. 4.
Figure 6:
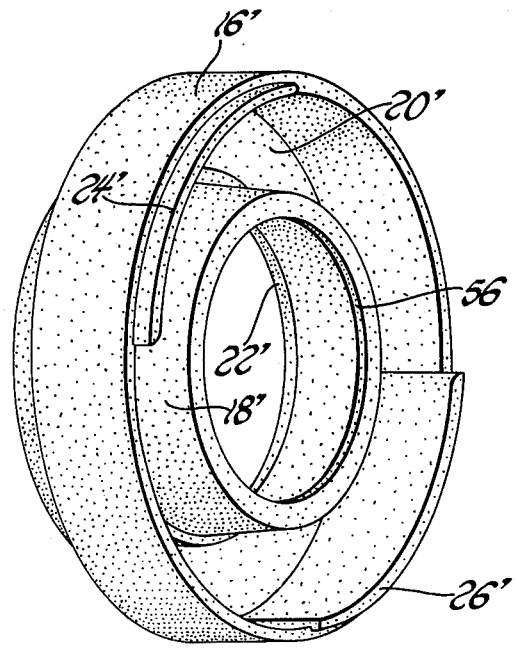
FIG. 6 is a perspective view of one piece of the two-piece tire portion.

The second embodiment of the vehicle wheel assembly constructed in accordance with the instant invention is shown in FIGS. 4 through 6. Elements of the second embodiment which are similar to those of the first embodiment are identified with primed numerals corresponding to the numeral identifying a corresponding element of the first embodiment.

The vehicle wheel assembly 10' shown in FIGS. 4, 5 and 6 includes a substantially hollow tire portion made of two structurally identical shells 12' and 14'. The two shells 12' and 14' are made from a relatively rigid plastic material as are the shells of the first embodiment. Each of the shells 12' and 14' includes an outer annular wall 16', an inner annular wall 18' generally concentric with the outer wall 16', and a sidewall 20' joining the outer and inner walls 16' and 18' along their exterior edges. The shells 12' and 14' also include an annular recess 22' formed at the juncture between the inner annular wall 18' and the sidewall 20'. Each of the shells 12' and 14' also includes a pair of flanges 24' and 26' offset radially inwardly from the outer annular wall 16' and extending beyond the edges thereof for underlying the outer annular wall 16' of the mating shell.

The foregoing elements of the tire portion of the second embodiment are all substantially identical to their counterparts in the first embodiment and serve the same functions. Each shell 12' and 14' of the tire portion of the second embodiment, however, includes a retaining lip 56 extending radially inwardly from the inner annular wall 18'. As will be hereinafter described in greater detail, the retainer lips 56 frictionally engage a wheel portion for maintaining the shells 12' and 14' is mating engagement on the wheel portion. This, therefore, comprises the basic difference between the two embodiments; that is, that the manner in mounting the tire portion on a wheel portion is slightly different. It is pointed out, however, that the shells 12' and 14' of the tire portion remain structurally identical to each other and, therefore, can be formed by a single mold.

Although the retainer lip 56 is contemplated to be made as small as possible, it still results in an undercut. Although the undercut is not nearly as serious as the undercut which is formed by the sidewall when the tire portion is made in one piece, the existence of an undercut does present problems when relatively rigid plastic is being employed. Due to their fast curing times and their rigidity, polypropylene or polystyrene could pose problems. Experimental runs with polypropylene have indicated that, although the retainer lip 56 can be formed, it is oftentimes difficult to strip the shell from the core without cracking it. It is, therefore, recommended that a low-density polyethylene be employed to form the shells 12' and 14' having the retainer lip 56.

The wheel portion, generally shown at 58, employed in the second embodiment is of a one-piece construction and includes a cylindrical portion 60 for receiving both of the shells 12' and 14'. A flange 62 extends radially from one end of the cylindrical portion 60 for engaging one of the shells. As shown in FIG. 5, the flange 62 seats in the annular recess 22' formed at the junction between the inner wall 18' and sidewall 20. The outer diameter of the cylindrical portion 60 is just slightly larger than the inner diameter formed by the retainer lip 56. It is noted that due to the rigid nature of the shells 12' and 14', only a very small difference in the diameters is required. The wheel portion 58 is formed through the cylindrical opening formed by the two inner walls 18' on the shells 12' and 14' when they are disposed in mating engagement. The retainer lips 56 snap over the end of the wheel portion 58 and snugly engage the outer surface of the cylindrical portion 60. The engagement between the retainer lips 56 and the surface of the cylindrical portion 60 is sufficient to prevent inadvertent sliding therebetween. It is noted, however, that the wheel portion 58 may be forced out of the tire portion by moving it towards the right, as shown in FIG. 5, if sufficient force is applied. The tire portion 58 may be of any desirable plastic material, but is preferably made of polystyrene which is exceptionally rigid and suitable for receiving appropriate decorative paint.

In summary, the instant invention provides a vehicle wheel assembly which facilitates the adoption of plastic materials other than polyvinyl chloride by reducing the manufacturing costs which would be encountered by direct substitution of other plastic materials in heretofore known wheel assemblies. Specifically, by providing a two-piece tire portion in which both pieces are structurally identical and capable of mating one with the other, a single mold may be employed to produce the tire portion. This eliminates the need for an additional mold, and, in some cases, as additional molding machine, for producing the tire portion. The design of the vehicle wheel assembly of the instant invention also maintains the authentic appearance which is an important consideration in the manufacture and sale of scale model vehicles.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that the invention may be practiced otherwise than as specifically described yet remain within the scope of the appended claims.

The embodiments of the invention in which an exclusive property or privilege is claimed are defined as follows:

1. A vehicle wheel assembly for a toy vehicle comprising: a substantially hollow tire portion including two structurally identical mating shells made of a relatively rigid plastic material, each of said shells including an outer annular wall, an inner annular wall generally concentric with said outer annular wall, and a side wall joining said outer and inner annular walls along their exterior edges, said shells including means for facilitating mutual alignment and support thereof and being in mating engagement along the outer peripheral center line of said tire portion; a wheel portion for receiving said tire portion; and retaining means for retaining said shell members in mating engagement on said wheel portion, said retaining means including a retainer lip extending generally radially inwardly from said inner annular walls of said mating shells for frictionally engaging said wheel portion; said wheel portion including a substantially cylindrical portion for receiving said shells and a flange extending radially from one end of said cylindrical portion for engaging one of said shells; the outer diameter of said cylindrical portion being slightly greater than the inner diameter of said retainer lip.

2. An assembly as set forth in claim 1 wherein said shells are made from a material selected from the group consisting of polypropylene, polyethylene, and polystryene.

3. An assembly as set forth in claim 1 wherein said shells are made of low-density polyethylene.

4. An assembly as set forth in claim 3 wherein said shells include an annular recess at the juncture between said inner annular wall and said sidewall.

5. An assembly as set forth in claim 4 wherein said shells include flanges offset radially inwardly from said outer annular walls extending beyond the edges thereof for underlying said outer annular wall of the mating shell.

6. An assembly as set forth in claim 5 wherein each of said shells includes a pair of said flanges, each of said flanges being of a length not more than one-quarter of the circumference of said outer annular wall and being located symmetrically and diametrically opposite to the other of said flanges.

* * * * *